(12) United States Patent
Abadi

(10) Patent No.: US 10,152,896 B2
(45) Date of Patent: Dec. 11, 2018

(54) TEACHING DEVICE

(71) Applicant: Tahrehe Mahmoodi Ahmad Abadi, Qom (IR)

(72) Inventor: Tahrehe Mahmoodi Ahmad Abadi, Qom (IR)

( * ) Notice: Subject to any disclaimer, the term of this patent is extended or adjusted under 35 U.S.C. 154(b) by 195 days.

(21) Appl. No.: 15/134,063

(22) Filed: Apr. 20, 2016

(65) Prior Publication Data

US 2016/0314693 A1  Oct. 27, 2016

(51) Int. Cl.
*G09B 23/00* (2006.01)
*G09B 1/02* (2006.01)
*G09B 21/00* (2006.01)

(52) U.S. Cl.
CPC ............ *G09B 1/02* (2013.01); *G09B 21/003* (2013.01)

(58) Field of Classification Search
USPC ........ 434/247, 258, 112, 276; 446/168, 169, 446/227, 489
See application file for complete search history.

(56) References Cited

U.S. PATENT DOCUMENTS

| | | | |
|---|---|---|---|
| 457,397 A * | 8/1891 | Church | A63H 1/06 446/241 |
| 1,252,158 A | 1/1918 | Okel | |
| 3,581,408 A * | 6/1971 | Mohier | A63F 9/0876 273/441 |
| 3,952,424 A * | 4/1976 | Herr | G09B 11/00 434/162 |
| 4,278,308 A | 7/1981 | Gotberg | |
| D309,165 S * | 7/1990 | Kaplan | D19/59 |
| 5,112,268 A * | 5/1992 | Klaus | A63F 7/3622 434/258 |
| 5,133,684 A * | 7/1992 | Rhodes | A63H 33/00 248/153 |
| 5,551,933 A * | 9/1996 | Washburn | A63B 23/14 446/170 |
| 5,676,622 A * | 10/1997 | McFarlane | A63B 23/14 273/109 |
| D397,743 S * | 9/1998 | Chesler | D21/548 |
| 6,203,398 B1* | 3/2001 | Lin | A63H 33/00 446/489 |
| D451,969 S * | 12/2001 | Chesler | D21/468 |
| 7,645,221 B1 | 1/2010 | Curry | |
| D719,220 S * | 12/2014 | Chase | D21/398 |
| 8,951,087 B2 | 2/2015 | Doroszkiewicz | |
| 2009/0111351 A1* | 4/2009 | Krochak | A63F 9/34 446/137 |

FOREIGN PATENT DOCUMENTS

| | | |
|---|---|---|
| CN | 201404687 | 2/2010 |
| CN | 202410135 U | 9/2012 |

* cited by examiner

*Primary Examiner* — Kurt Fernstrom
(74) *Attorney, Agent, or Firm* — NovoTechIP International PLLC

(57) ABSTRACT

A teaching device includes a base and a first set of equipment. The first set of equipment includes a first rod portion including a first spiraling rod portion installed in the base. A first encircled object is disposed on the base plate and is encircled by the first spiraling rod portion. Also included is a first rod slider. The first rod slider is slidably movable along the first rod portion and around the first encircled object.

19 Claims, 1 Drawing Sheet

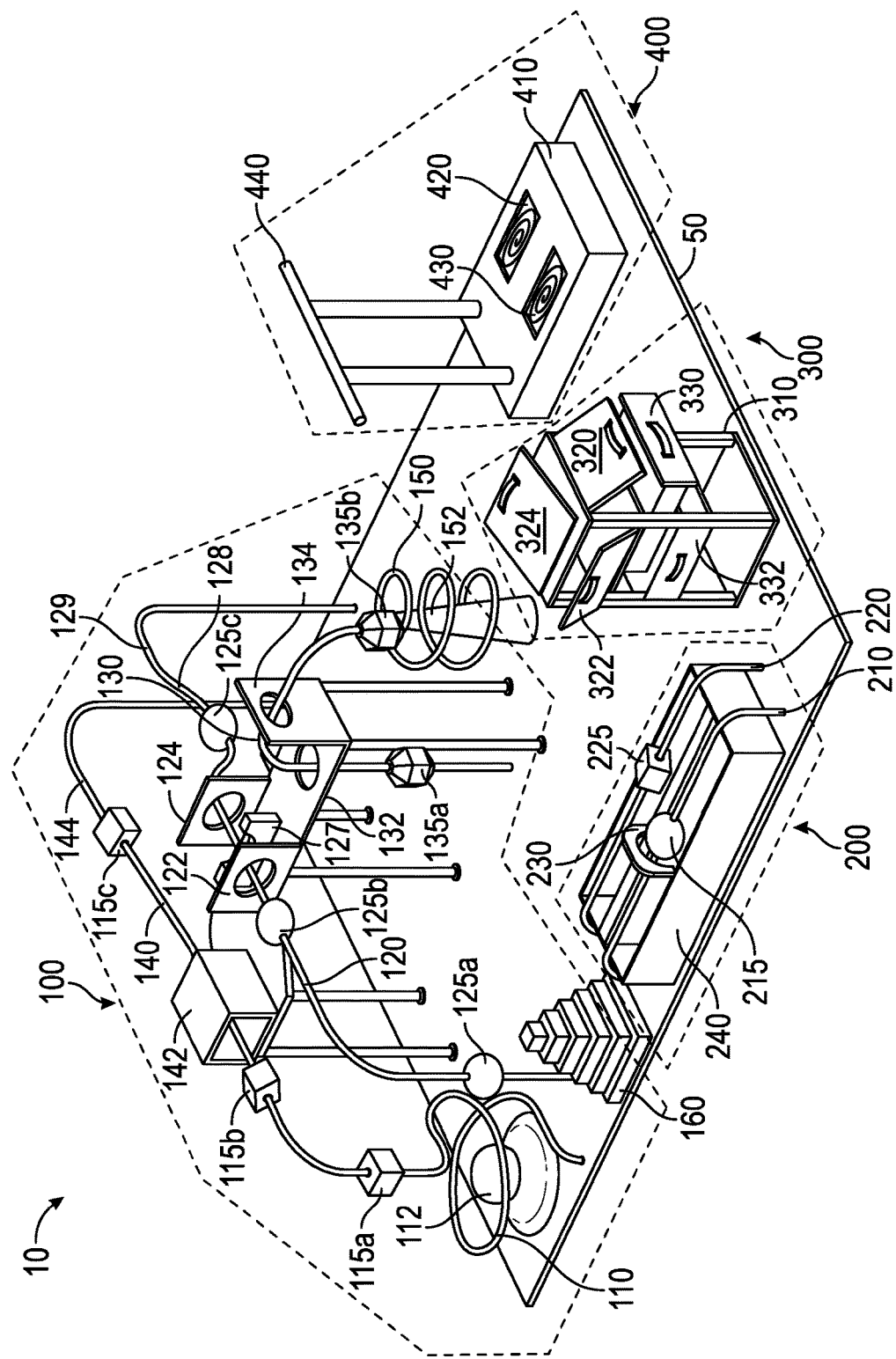

TEACHING DEVICE

CROSS REFERENCE TO RELATED APPLICATION

This application claims the benefit of priority to an Iran patent application having serial number 139450140003001088 filed on Apr. 22, 2015, which is incorporated by reference herein in its entirety.

BACKGROUND

In order to teach many linguistic concepts such as name, verb, adjective, etc., different teaching aid instruments have been supplied that have facilitated learning of these concepts. One of the less studied categories is teaching of prepositions, especially directional concepts such as up, down, below, on, across, etc. Generally these linguistic concepts are learned through sight, and even seeing persons learn these concepts later than other concepts such as names and verbs. In some occasions, even adults face some problems in understanding, recognizing, and reciting examples of prepositions (such as across, beside and front). On the other hand, understanding these concepts is more difficult for blind persons because space concepts are most easily understood through sight, and teachers may use different techniques such as pointing and moving in order to teach these concepts. By looking into the studies that have been done, there is a lack of a comprehensive teaching instrument capable of being used for teaching such concepts to seeing, low-vision and blind students by using movements, playing, experimenting and touching.

SUMMARY

In one general aspect, the instant application describes a teaching device including a base and a first set of equipment. The first set of equipment may include a first rod portion including a first spiraling rod portion installed in the base. A first encircled object may be disposed on the base plate and may be encircled by the first spiraling rod portion. Also included is a first rod slider. The first rod slider may be slidably movable along the first rod portion and around the first encircled object.

In certain implementations, the first set of equipment may further include a second rod portion. A first plate may be disposed around the second rod portion. A second plate may also be disposed around the second rod portion. The second plate may be substantially parallel to and spaced apart from the first plate. The first rod slider or a second rod slider may be slidably movable along the second rod portion and movable through the first and second plates.

In other implementations, the first set of equipment may further include a third rod portion. A substantially horizontal plate may be disposed around the third rod portion. A substantially vertical plate may be disposed around the third rod portion and may be substantially perpendicular to the substantially horizontal plate. The first rod slider or a third rod slider may be slidably movable along the third rod portion and movable through the substantially horizontal and vertical plates such that the first rod slider or the third rod slider may be configured to be positioned below the substantially horizontal plate, above the substantially horizontal plate, behind the substantially vertical plate, or in front of the substantially vertical plate.

In certain examples, the third rod portion may be connected to the first rod portion, and the first rod slider may be slidably movable along the third rod portion through the substantially horizontal and vertical plates and along the first rod portion around the first encircled object. However, the present teachings are not limited thereto.

In other examples, the first set of equipment may further include a fourth rod portion. An in-out box may be disposed around a section of the fourth rod portion. The in-out box may have first and second opposing openings, and the first rod slider or a fourth rod slider may be slidably movable along the second rod portion and in and out of the in-out box through the first and second openings.

The first rod portion may be connected to the fourth rod portion, and the first rod slider may be slidably movable along the first rod portion around the first encircled object and along the fourth rod portion in and out of the in-out box through the first and second openings. However, the present teachings are not limited thereto.

In certain implementations, the first set of equipment further includes a second rod portion and a first plate disposed around the second rod portion. A second plate may be disposed around the second rod portion and may be substantially parallel to and spaced apart from the first plate. A second rod slider may be slidably movable along the second rod portion and movable through the first and second plates. A third rod portion may also be included. A substantially horizontal plate may be disposed around the third rod portion. A substantially vertical plate may be disposed around the third rod portion and may be substantially perpendicular to the substantially horizontal plate. A third rod slider may be slidably movable along the third rod portion and movable through the substantially horizontal and vertical plates such that the third rod slider is configured to be positioned below the substantially horizontal plate, above the substantially horizontal plate, behind the substantially vertical plate, or in front of the substantially vertical plate. A fourth rod portion may also be included. An in-out box may be disposed around a section of the fourth rod portion. The in-out box may have first and second opposing openings. A fifth rod portion may include a second spiraling rod portion installed in the base. A second encircled object may be disposed on the base plate and encircled by the second spiraling rod portion. The first rod slider may be slidably movable along the fourth rod portion and in and out of the in-out box through the first and second openings, and the third rod slider may be slidably movable along the fifth rod portion around the second encircled object.

In certain examples, the first set of equipment may further include a relative-position object configured to be positioned on the base. One of the first and second sliders may be configured to be positioned closer to the relative-position object than the other of the first and second sliders.

In other examples, the first set of equipment may further include a midpoint marker disposed at a position substantially halfway between the first and second plates.

In certain implementations, the teaching device may further include a second set of equipment including first and second substantially parallel rails disposed upon the base. Each of the first and second rails may have first and second support portions installed in the base and a main rail portion extending in a length direction between the first and second support portions. A rail-center marker may be disposed at a center point of the main rail portion of the first rail or the second rail in the length direction. A first rail slider may be slidably disposed on the first rail and may be movable relative to the rail-center marker. A second rail slider may be slidably disposed on the second rail and may be movable relative to the first rail slider.

The second set of equipment may further include a box disposed on the base; however, the present teachings are not limited thereto. The box may have opposing upper and lower sides, and the lower side may be adjacent the base. The rail-center marker may be disposed at a center of a length of the box in the length direction. The first support portions of the first and second rails may extend from the base on one side of the box and the main rail portions may extend in the length direction above the upper side of the box.

In certain cases, the teaching device may further include a third set of equipment. The third set of equipment may include a frame having a first axis portion. A first hinged door may be disposed in the frame. The first hinged door may be rotatable about the first axis portion of the frame in a first rotation direction. A first drawer may be disposed in the frame. The first drawer may be reciprocatable between an open, extended position and a closed, retracted position.

The third set of equipment may further include a second hinged door and a second drawer disposed in the frame; however, the present teachings are not limited thereto. The second hinged door may be rotatable about a second axis portion of the frame in a different direction than the first rotation direction. The second drawer may be reciprocatable between an open, extended position and a closed, retracted position.

In certain implementations, the teaching device may further include a balance platform configured to support the weight of a person. The balance platform may include a balance platform base. A first foot supporter may be disposed on the balance platform base. The first foot supporter may include a first spring and may be configured to support a first foot of the person. A support bar may be disposed on the balance platform base or on the base of the device. The support bar may be configured to help the person maintain balance while standing on the first foot supporter.

The balance platform may further include a second foot supporter disposed on the balance platform base; however, the present teachings are not limited thereto. The second foot supporter may include a second spring and may be configured to support a second foot of the person or a foot of another person.

Also disclosed is a teaching method using the teaching device. In one example, the method may include moving the first rod slider along the first spiraling rod portion around the first encircled object, and teaching a student that the first slider turns around the first encircled object.

In another example, the teaching method may include moving one of the first, second, and third rod sliders along one of the first, second, third, fourth, and fifth rod portions, and teaching a student a spatial, directional, or motional concept based on the moving one of the first, second, and third rod sliders.

In certain implementations, the teaching device may further include electronic circuitry configured to detect a position or action of the first, second, or third rod sliders.

The electronic circuitry may be further configured to play an audio message indicating the position or action of the first, second, or third rod sliders; however, the present teachings are not limited thereto.

In another example of a teaching method using the teaching device, the teaching method may include recognizing, by the electronic circuitry, that the first, second, or third rod slider has been moved, and playing the audio message indicating the position or action of the first, second, or third rod sliders.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 illustrates an example teaching device including four sets of equipment disposed on a base.

DETAILED DESCRIPTION OF PREFERRED EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry may have been described at a relatively high-level, without detail, in order to avoid unnecessarily obscuring aspects of the present teachings.

Research (Mahmoudi[1]; Sadeghi et al;[2] each is incorporated by reference in its entirety) shows the differences between linguistic and non-linguistic categorization in students with damaged sight in comparison with seeing students. This research also shows that among linguistic concepts, the necessity of paying attention to connection categories, especially prepositions, is more manifest. Firstly, because these concepts reflect mainly space connections in a language and are mainly learned through sight, blind persons face obstacles in understanding them. Secondly, among different types of linguistic and non-linguistic categories, prepositions are among linguistic ones that are even learned by seeing persons later than other concepts (such as name and verb). On some occasions, even adults may face some trouble in understanding, recognizing, and reciting examples of this type of concept. Based on above elements, there is a need for a comprehensive device for visual, tactile and vocal teaching of directional and motional concepts to children. Therefore, a teaching device has been developed to fill this need.

[1] T. Mahmoudi, *Comparison of the categorization of concepts in seeing and blind persons*, Postgraduate Thesis on General Philology, Shahid Beheshti University, Tehran, 2011.
[2] M. Sadeghi, K. Zahedi, T. Mahmoudi, *Categorization differences between seeing and blind persons*, Quarterly of Novelties in Cognitive Sciences, 2013.

A teaching device according to the present disclosure may be designed in a way to include most or all directional concepts, i.e. categories further to prepositions such as adjectives. In some instances, these directional concepts are not prepositions; they are adjectives that are considered as an associating category according to the theory of Langacker. Further, usage of this device is not limited to blind persons; seeing persons as well as students who suffer from other disabilities may use it.

Certain implementations of the teaching device may be used for teaching more than 20 types of directional and motional concepts to seeing, low vision and blind children. Prior to use of the device, directional concepts may be identified, and then by using device equipment, such as moving sliders along rod portions and comparing different geometric volumes, for example, concepts may be taught to the children in visual, tactile and auditory forms.

The following are examples of directional concepts that may be taught using various examples of the teaching device:

1. Front: A noun and an adjective of a position in which something is in front of another thing. For example a tree is in front of a house.
2. Back: noun and adverb; means rear; the opposite direction of what a person faces; contrary to front.

3. Above: Preposition and adverb; the position of being higher than a level or a layer such as a lamp that is above a desk.
4. Below: Adverb and preposition; at a lower level or layer. An object that is below one thing; it is on the ground but is generally not lower than on the ground. On the other hand, being below something is not equal to being tangent to it, such as a tunnel that is below a cliff.
5. Middle: Adjective; a position that is of equal distance to both sides, like middle box in a crossword. In the middle we have an area but in between, we have an object.
6. Between: Preposition and adverb; the position between one thing and another one; between this tree and that tree is a river.
7. Left: Adjective and adverb; when a person is standing toward north, left is the position on his west side; his left eye.
8. Right: Opposite to left.
9. On: Preposition; a position which is physically in touch with a certain level and keeps it; for example a book is on the table.
10. Under: Preposition and adverb; lower level and exactly under something, like the gas saved under the North Sea; under water. This means that "on" is opposite of "under" and "above" is opposite of "below." "Above" and "below" are not tangent to a level but "on" is tangent and "under" is also tangent in most of the cases; for example pencil is under the book.
11. Distant: Adverb and adjective; position that is a place far away from something. My house is distant from the university.
12. Close: Opposite to distant.
13. Inside: Preposition and adverb; interior of something; to be closed in the interior of something; doll is inside the box.
14. Outside: Adverb and adjective; out of something; opposite of inside; my book is outside my bag.
15. Beside: Preposition; near; she sat beside me.
16. In front: Opposite to "beside"; a position where something is on the other side of something else. My shop is in front of the beauty parlour. She sat in front of me.
17. Across: Preposition and adverb; from one side to the other side; I ran across the river. It is like "in front" with the difference that "in front," something is exactly opposite another thing but in "across", it is not necessarily placed opposite to something else. It may be positioned to this side or the other side of another thing.
18. Around: Preposition and adverb; in all sides of something; I rolled the line around the pen; he has put vases around his house.

Apart from the above directional concepts, several motional concepts may also be taught using an implementation of the teaching device. The following are a few examples of additional concepts that may be taught using the teaching device:
1. Balance;
2. Pull and push;
3. Different geometric volumes such as ball, cube, pyramid, cone and polyhedron;
4. Clockwise and counter-clockwise circulation;
5. Opening and closing;
6. Rising and falling;
7. Steepness;
8. Step by step movement.

Specific examples of the linguistic, directional, and motional concepts listed above are described below as concepts that can be taught via specific parts of the teaching device 10. However, the concepts that are possible or advantageous to be taught using the teaching device 10 are not limited to those listed above or described below.

The teaching device of the present disclosure may take various forms. It may include a base and a set of equipment installed in the base. The set of equipment may be composed of various parts, and there may be more than one set of equipment included in the device. Students can learn directional or motional concepts at each part of the device. For example, a child may be positioned beside a slider having the shape of a spherical ball. When the child, who may be seeing, low-vision or blind, moves the ball, she can be taught the concept of motion, movement towards right and left, up and down, and the motion of the ball to the front or back of the plate as well as positioning of the ball beside another object such as a pyramid.

In another example, a set of equipment included in the teaching device may include a spiraling rod and an object, such as a stationary ball, that is encircled by the spiraling rod. There may be a slider, such as a cube shape, that may be movable along the spiraling rod and around the stationary ball. When the cube is moved around the ball, the concept of "around" may be taught, even, though not only, to a seeing-impaired student.

In certain implementations of the teaching device, simple tools may be used and designed as a playground, and concepts may be taught by two example methods:
1. Method of teaching by a trainer: For example, a trainer may position a child or student beside part of the device. By moving a cube inside and outside a box, the trainer may teach the child the concepts of "in" and "out." Then, the trainer may ask the child to do the movements herself. However, the training method does not necessarily include this.
2. Method of electronic audio training: A child or student may be positioned beside the device, and by moving a slider, such as a cube, inside a box, electronic circuitry or micro switches installed in the device may announce the audio message that "the cube is inside the box". By taking the cube out of the box, the audio message of "the cube is outside the box" may be announced.

FIG. 1 illustrates an example teaching device. The teaching device shown in FIG. 1 may allow teaching of more than 18 space connections and 8 motional connections. However, in other examples, the teaching device may include only a portion of the equipment shown in FIG. 1, or other types of equipment not shown in FIG. 1.

The teaching device 10 shown in FIG. 1 includes a base 50, and four sets of equipment 100, 200, 300, and 400. Although all four sets of equipment are shown on the device 10, it is possible for each set of equipment to be constructed as a separate device. Thus, a teaching device 10 may include only a single set of equipment—100, 200, 300, or 400. In other implementations, the device 10 may include two, three, four, or more sets of equipment. The device 10 can also be constructed with some parts or portions of one or more of the sets of equipment. Furthermore, various pieces of the device 10 can be made of different qualities and textures and in various sizes, depending on existing needs.

The base 50 of the teaching device 10 is not limited to a particular size, as long as it is big enough to hold the equipment placed upon or installed on it. In certain implementations, the base 50 may be 2.5×3 m.

The first set of equipment 100 may include various rod portions, rod sliders, and other objects. As the rod portions may be connected, intertwined with, or placed near one another, the first set of equipment 100 may be referred to as the "tangled rods" section. However, the first set of equipment may include a single rod portion, or various rod portions that are neither near each other nor "tangled." The first set of equipment 100 includes at least one rod slider (such as 115a) that is movable along a rod portion (such as first rod portion 110). FIG. 1 shows three different shapes of rod sliders: cubes (115a-c), spheres (125a-c), and polyhedrons (135a-b). However, the shapes of the rod sliders are not limited to cubes, spheres, and polyhedrons. The rod sliders may be shaped in any of numerous geometric or other forms. The first set of equipment 100 may also include geometric shapes or volumes or other objects (such as ball 112, cone 152, and pyramid 160) that are stationary or are not configured to slide along rod portions. The geometrical volumes and shapes may include spherical, cubic, pyramidal, hexahedral, or other simple or complex geometrical forms. These objects may be included for comparison with the movable rod sliders to teach various concepts.

In the first set of equipment 100, the shapes and curvature of the different rod portions are not particularly limited. The rod portions may be straight, curved, steep, spiraling, or any other form that would allow a slider to be positioned along each rod portion.

In the example shown in FIG. 1, the first rod portion 110 is a spiraling rod portion that encircles an object 112 such as a ball. The encircled object 112 may be stationary, or may be movable in its place (for example, it may be capable of spinning or rotating). A first slider such as 115a may be configured to move or slide along the first rod portion 110 and around the encircled object 112. When the first rod slider 115a is moved around the first encircled object 112, the concept of "around" may be taught.

FIG. 1 shows three first rod sliders 115a, 115b, and 115c that are each movable along the first rod portion 110 and around the encircled object 112. However, the number of rod sliders is not particularly limited; there may be one, two, three, or more rod sliders. Also, in FIG. 1, first rod sliders 115a, 115b, and 115c are cube-shaped; however, the shape of the rod sliders is not particularly limited. For example, first sliders 115a, 115b, and 115c may each have a different shape, or they may have shapes other than a cube.

The first set of equipment 100 shown in FIG. 1 also includes a second rod portion 120. A pair of parallel plates 122 and 124 may be disposed around the second rod portion 120 such that the second plate 124 is parallel to and spaced apart from the first plate 122. FIG. 1 shows second sliders 125a, 125b, and 125c that are movable along the second rod portion 120 and through the first and second parallel plates 122 and 124. When one of the second sliders (e.g. 125b) is moved between the first and second plates 122 and 124, the concept of "between" can be taught.

FIG. 1 shows a midpoint marker 127 disposed substantially halfway between the first and second plates 122 and 124 in certain implementations. The midpoint marker 127 may be used to teach the concept of the "middle" of the two plates.

The example second rod portion 120 shown in FIG. 1 includes a curved section having a lower portion 128 and a higher portion 129. The concept of "curvature" can be taught using this section. Additionally, when a slider, such as second rod slider 125c, is moved from the lower portion 128 to the higher portion 129 and vice versa, the concepts of "rising" and "falling" can be taught. FIG. 1 also shows a vertical part of the second rod section 120; the concept of "up and down" motion can be taught by moving the second rod slider 125a along this part.

In FIG. 1, the second rod sliders 125a, 125b, and 125c are sphere-shaped; however, the shape of the sliders is not particularly limited. Also, as in the case of the first rod sliders, although FIG. 1 shows three second rod sliders, 125a, 125b, and 125c, the number of rod sliders is not particularly limited. In another implementation, if the first rod portion 110 were connected to the second rod portion 120, a single rod slider could be used to slide along both the first and second rod portions 110 and 120. This concept can be applied to all of the rod portions in the first set of equipment 100, as discussed further below.

The first set of equipment 100 shown in FIG. 1 includes a third rod portion 130. A substantially horizontal plate 132 and substantially vertical plate 134 may be disposed around the third rod portion 130, such that horizontal plate 132 is substantially perpendicular to vertical plate 134. In the implementation shown, third rod sliders 135a and 135b are movable along the third rod portion 130 and through the set of perpendicular plates 132 and 134. Various concepts may be taught based on the position of a rod slider (e.g. 135a) relative to the perpendicular plates 132 and 134. For example, the concepts of "above" and "below" as well as "on" and "under" may be taught when third rod slider 135a is above, below, on, or under the horizontal plate 132. Also, the concepts of "right" and "left" may be taught based on the position of the third rod slider 135a relative to the vertical plate 134. The concept of "through" may be taught when a slider passes through any of the horizontal and vertical plates 132 and 134 or through either of the parallel first and second plates 122 and 124.

In the example shown in FIG. 1, an extension of the horizontal plate 132 supports other elements such as parallel first and second plates 122 and 124, midpoint marker 127, and in-out box 142. However, the present teachings are not limited thereto, and the horizontal plate 132 may be completely separate from or not adjacent to those elements.

The first set of equipment 100 shown in FIG. 1 includes a fourth rod portion 140. An in-out box 142 is disposed around the fourth rod portion 140, such that a rod slider (e.g. 115b) may be movable along the fourth rod portion 140 into and out of the in-out box 142. Therefore, the concepts of "inside" and "outside" can be taught using these elements. In the example shown in FIG. 1, the fourth rod portion 140 is connected to the first rod portion 110, and the same first rod sliders 115a, 115b, and 115c are movable along both the first rod portion 110 and the fourth rod portion 140. However, in other implementations, the fourth rod portion 140 may be separately installed in the base 50 and have a fourth rod slider on it that is not slidable along the first rod portion 110.

In the example shown in FIG. 1, the fourth rod portion 140 is shown as sloping downward towards the in-out box 142. If this downward-sloping portion 144 is steep, the concept of steep motion can be taught.

The first set of equipment 100 shown in FIG. 1 also includes a fifth rod portion 150 including second spiraling rod portion encircling a second encircled object 152. The second encircled object 152 is depicted as a cone in FIG. 1; however, it is not limited thereto and may be any geometric or other shape that is encircled by the spiraling portion of the fifth rod portion 150. Like the first rod portion 110, moving a slider (e.g. third rod slider 135b) around the spiraling portion of the fifth rod portion 150 allows for the teaching of the concept of "around," (as in turning around the cone 152). In the example shown in FIG. 1, the fifth rod portion 150 is connected to the third rod portion 130, and the same third rod sliders 135*a* and 135*b* are movable along both the third rod portion 130 and the fifth rod portion 150. However, in other implementations, the fifth rod portion 150 may be separately installed in the base 50 and have a rod slider on it that is not slidable along the third rod portion 130.

The first set of equipment 100 shown in FIG. 1 also includes a relative-position object 160, which is depicted as, but not limited to, a stepped pyramid. The relative-position object 160 may be positioned on the base 50, and various concepts may be taught based on the positions of certain rod sliders relative to the relative-position object 160. For example, in FIG. 1, the concept of "beside (or adjacent or next to" can be taught when the second slider 125*a* arrives at the base 50 next to the stepped pyramid 160. The concept of "in front of" may be taught when the first rod slider 115*a* arrives on the base 50 in front of (but spaced apart from) the stepped pyramid 160. The position of the second slider 125*a* may be compared to that of the first rod slider 115*a* on the base 50 relative to the stepped pyramid 160.

In a certain sense, the rod portions 110, 120, 130, 140, and 150 as well as the plates 122, 124, 132, and 134, encircled objects 112 and 152, in-out box 142, and relative-position object 160 can be considered modular, as they can be arranged in various arrangements and not only as shown in FIG. 1. For example, second rod portion 120 could be connected to third rod portion 130, though this implementation is not shown. As discussed above, if all of the rod portions 110, 120, 130, 140, and 150 were connected in series, a single rod slider could be used to slide along all of the rod portions. However, in the example shown in FIG. 1, the first rod portion 110 is connected to the fourth rod portion 140, and the third rod portion 130 is connected to the fifth rod portion 150. Therefore, all three first sliders 115*a*, 115*b*, and 115*c* are movable along the first and fourth rod portions 110 and 140, and both of the third rod sliders 135*a* and 135*b* are movable along the third and fifth rod portions 130 and 150.

Also, in other implementations, different objects such as additional plates, sliders, and stationary volumes may be positioned in various parts of the device 10 so that students experience concepts such as motion, up, down, inside, outside, between, middle, etc. Furthermore, the concepts that can be taught using different parts of the device 10 are not limited to those listed in connection with each part. More than one part may be used to teach the same concept, and more than one concept may be taught using each part or portion of the device 10. For example, the concepts of "front" and "back" may be taught using the motion of a slider through any of plates 122, 124, and 134, or by using other portions of the teaching device 10. The concepts that may be taught using each set of equipment 100, 200, 300, and 400 are not limited to the concepts mentioned herein in connected to each set of equipment.

The second set of equipment 200 shown in FIG. 1 includes first and second substantially parallel rails 210 and 220 disposed upon the base 50. Each of the first and second rails has first and second support portions installed in the base 50 and a main rail portion extending in a length direction between the first and second support portions. The first and second support portions may be upright or substantially vertical, and the main rail portion may be substantially horizontal, as shown in FIG. 1. However, they are not limited thereto, and the first and second rails 210 and 220 may be inclined at an angle in certain implementations.

The first rail slider 215 is slidably disposed on the first rail 210 and can be moved along the first rail 210. A second rail slider 225 is slidably disposed on the second rail 220 and can be moved along the second rail 220. The second rail slider 225 is movable relative to the first rail slider 215. The concepts of "close" and "distant" may be taught using the relative position of the first and second rail sliders 215 and 225. Furthermore, concepts related to relative movement may be taught using the relative movement of the first and second rail sliders 215 and 225. Although the first rail slider 215 is depicted as a sphere and the second rail slider 225 is depicted as a cube in FIG. 1, the shapes of the first and second rail sliders 215 and 225 are not particularly limited thereto.

A rail-center marker 230 may be disposed at a center point of the main rail portion of the first rail 210 or the second rail 220 in the length direction. The concept of "middle" may be taught using the position of the rail-center marker 230 relative to the first rail 210 or the second rail 220. In certain implementations, the rail-center marker 230 may include a plate at the middle point of the trajectory of the first rail slider 215. The first rail slider 215 or the second rail slider 225 or both may be movable relative to the rail-center marker 230. When the first rail slider 215 or the second rail slider 225 is moved over the rail-center marker 230, the concept of "middle" may be further taught by teaching that the rail slider is in the middle its rail.

The second set of equipment 200 may further include a box 240 disposed on the base 50. The box 240 may be installed or placed on the base 50 during construction of the teaching device 10 or at any point afterwards. The rail-center marker 230 may be disposed at a center of a length of the box 240 in the length direction. Therefore, the concept of "middle" may further be taught by describing the rail-center marker 230 as indicating the middle of the length of the box 240.

The first support portions of the first and second rails 210 and 220 may extend from the base 50 on one side of the box 240, and the main rail portions of the first and second rails 210 and 220 may extend in the length direction above the upper side of the box 240. As the rail sliders 215 and 225 are movable along the rails 210 and 220 across the length of the box 240, the concept of "across" can be taught. The movement of the sliders 215 and 225 across the box 240 can also be used to teach the concept of full length movement.

The third set of equipment 300 shown in FIG. 1 includes a frame 310, a first hinged door 320 disposed in the frame 310, and a first drawer 330 disposed in the frame 310. The frame 310 may have a first axis portion, and the first hinged door 320 may be rotatable about the first axis portion of the frame in a first rotation direction. In certain implementations, there may be additional hinged doors disposed in the frame 310, such as the second hinged door 322 and the third hinged door 224 shown in FIG. 1. The second hinged door 322 may be rotatable about a second axis portion of the frame 310 in a different direction than the first rotation direction. In certain implementations, there may be five hinged doors disposed in the frame 310 positioned in a way that the directions of their openings are different from each other. The hinged doors 320, 322, 324, and others, may be used to teach concepts such as axial movement and directions, turning, opening and closing, as well as clockwise and counter-clockwise movement.

The first drawer 330 disposed in the frame 310 may be reciprocatable between an open, extended position and a closed, retracted position. There may be more than one drawer disposed in the frame 310; the example in FIG. 1 shows a second drawer 332. The first drawer 330, as well as the second drawer 332 and additional drawers, if they are included, can be used for explaining concepts of pulling, pushing, and back and front. Therefore, the third set of equipment 300 may alternately be called a "pull and push cabin."

The fourth set of equipment 400 shown in FIG. 1 can also be called a "balance platform." The balance platform 400 includes a balance platform base 410, a first foot supporter 420 disposed on the balance platform base 410, and a support bar 440. The first foot supporter 420 includes a first spring and is configured to support a first foot of the person. The first foot supporter 420 may have one or more springs placed under it so that the person mounted on the balance platform 400 may be positioned in a suspension position. In certain implementations, the balance platform 400 also includes a second foot supporter 430 disposed on the balance platform base 410. Each foot supporter 420 and 430 may have under it one or more springs such that the student will be positioned in a suspension position when placing one foot on each of the first and second foot supporters 420 and 430. Then the student may try to move her body in different directions while maintaining her balance. Alternatively, the balance platform 400 may support two students, with a first student placing one or two feet on the first foot supporter 420 and a second student placing one or two feet on the second foot supporter 430.

The support bar 440 may be placed on or installed in the balance platform 400 or directly on the base 50 of the teaching device 10 to help the student maintain her balance (or students maintain their balance). In certain implementations, the support bar 400 may have a height of 150 cm from the balance platform base 410 or from the base 50 of the teaching device 10.

The teaching device 10 may include electronic circuitry installed in one or more sets of equipment 100, 200, 300, or 400. The electronic circuitry may include electronic circuits or micro switches and may be configured to detect a position or action of a part of the device 10 such as a rod slider, rail slider, hinged door (320, 322, or 324). The electronical circuitry may alternatively or additionally be configured to detect a position of a teacher, student, or other person using the teaching device 10. The electronic circuitry may enable playing of audio messages for teaching directional and motional concepts. For example, a child may be positioned beside the fourth rod portion 140. When the child moves a cube (such as rod slider 115*b*) inside the in-out box 142, the electronic circuitry or micro switches of the device may announce the audio message that "the cube is inside the box". When the cube 115*b* is taken out of the in-out box 142, the audio message of "the cube is outside the box" may be announced.

As described above, implementations of the device can be used for teaching in at least two methods: teaching by trainer, and teaching by audio training. The first method, that of teaching by a trainer, can be implemented without electronic circuitry installed in the device, or when the electronic circuitry is turned off or non-functional. For example, by moving cube 115*b* inside and outside the in-out box 142, the trainer may teach the child the concepts of "in" and "out," without necessarily using electronic circuitry.

The second method, that of teaching by audio training, can be implemented using an audio system including the electronic circuitry described above.

To use the teaching device 10, it is sufficient to install or place the base 50 of the device 10 at an intended place of use such as playground of the educational institution or kindergarten in order to install any part of the teaching device 10 on it. Once equipment is disposed or installed on the base 50, one can teach directional and motional concepts to students.

To construct examples of the teaching device 10, on may use rods, different geometrical volumes and plates cut in different shapes and with different qualities. Then cutting may be done according to a plan in appropriate sizes in order to be installed using nails, screws, glue, or other attaching medium. After that, electronic circuits or switches may be installed in the pieces to make use of the device's digital audio system, if included.

The teaching device 10 may be used as a pedagogical instrument in houses, schools, kindergartens and educational centers for students of all levels of ability. It may be used in educational centers for talented children as well as those who are of special mental conditions.

The teaching device 10 of the present disclosure may allow for teaching more than 20 directional and motional concepts to students in one comprehensive teaching package. It may further be used in teaching of directional and motional concepts to seeing, blind and low vision persons by combining visual, tactile and vocal methods. It may help teach precise distinction between close concepts such as on and above, under and below, middle and between, etc. The teaching device 10 may be capable of being used in two forms: with a trainer or by using a digital vocal system.

Using the teaching device 10 may turn theoretical teaching of abstract concepts into practical teaching of concepts. Furthermore, the teaching device 10 may be based on game as a leisure educational instrument. In addition, the teaching device 10 may have simplicity of production and vast area of utility.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The foregoing description and drawings are accordingly to be regarded in an illustrative rather than restrictive sense.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A teaching device comprising:
   a base;
   a first set of equipment, the first set of equipment comprising:
      a first rod portion, the first rod portion including a first spiraling rod portion installed in the base;
      a first encircled object disposed on the base plate and encircled by the first spiraling rod portion;
      a first rod slider, wherein:
   the first rod slider is slidably movable along the first rod portion and around the first encircled object,
   the first set of equipment further comprises:
      a second rod portion;
      a first plate disposed around the second rod portion; and
      a second plate disposed around the second rod portion, the second plate substantially parallel to and spaced apart from the first plate, and
   the first rod slider or a second rod slider is slidably movable along the second rod portion and movable through the first and second plates.

2. The teaching device of claim 1, wherein the first set of equipment further comprises:
   a third rod portion;
   a substantially horizontal plate disposed around the third rod portion; and
   a substantially vertical plate disposed around the third rod portion and substantially perpendicular to the substantially horizontal plate,
   wherein the first rod slider or a third rod slider is slidably movable along the third rod portion and movable through the substantially horizontal and vertical plates such that the first rod slider or the third rod slider is configured to be positioned below the substantially horizontal plate, above the substantially horizontal plate, behind the substantially vertical plate, or in front of the substantially vertical plate.

3. The teaching device of claim 2,
   wherein the third rod portion is connected to the first rod portion, and the first rod slider is slidably movable and along the third rod portion through the substantially horizontal and vertical plates and along the first rod portion around the first encircled object.

4. The teaching device of claim 1, wherein the first set of equipment further comprises:
   a fourth rod portion;
   an in-out box disposed around a section of the fourth rod portion, the in-out box having first and second opposing openings, wherein the first rod slider or a fourth rod slider is slidably movable along the second rod portion and in and out of the in-out box through the first and second openings.

5. The teaching device of claim 4, wherein the first rod portion is connected to the fourth rod portion, and the first rod slider is slidably movable along the first rod portion around the first encircled object and along the fourth rod portion in and out of the in-out box through the first and second openings.

6. The teaching device of claim 1, wherein the second rod slider slidably movable along the second rod portion and movable through the first and second plates, wherein the first set of equipment further comprises:
   a third rod portion;
   a substantially horizontal plate disposed around the third rod portion;
   a substantially vertical plate disposed around the third rod portion and substantially perpendicular to the substantially horizontal plate;
   a third rod slider slidably movable along the third rod portion and movable through the substantially horizontal and vertical plates such that the third rod slider is configured to be positioned below the substantially horizontal plate, above the substantially horizontal plate, behind the substantially vertical plate, or in front of the substantially vertical plate;
   a fourth rod portion;
   an in-out box disposed around a section of the fourth rod portion, the in-out box having first and second opposing openings;
   a fifth rod portion, the fifth rod portion including a second spiraling rod portion installed in the base; and
   a second encircled object disposed on the base plate and encircled by the second spiraling rod portion,
   wherein the first rod slider is slidably movable along the fourth rod portion and in and out of the in-out box through the first and second openings, and
   the third rod slider is slidably movable along the fifth rod portion around the second encircled object.

7. The teaching device of claim 6, wherein the first set of equipment further comprises a relative-position object configured to be positioned on the base, and wherein one of the first and second sliders is configured to be positioned closer to the relative-position object than the other of the first and second sliders.

8. The teaching device of claim 6, further comprising electronic circuitry configured to detect a position or action of the first, second, or third rod sliders.

9. The teaching device of claim 8, wherein the electronic circuitry is further configured to play an audio message indicating the position or action of the first, second, or third rod sliders.

10. A teaching method using the teaching device of claim 8, the method comprising:
recognizing, by the electronic circuitry, that the first, second, or third rod slider has been moved; and
playing the audio message indicating the position or action of the first, second, or third rod sliders.

11. The teaching device of claim 1, the first set of equipment further comprises a midpoint marker disposed at a position substantially halfway between the first and second plates.

12. The teaching device of claim 1, further comprising:
a second set of equipment, the second set of equipment comprising:
first and second substantially parallel rails disposed upon the base, each of the first and second rails having first and second support portions installed in the base and a main rail portion extending in a length direction between the first and second support portions;
a rail-center marker disposed at a center point of the main rail portion of the first rail or the second rail in the length direction;
a first rail slider slidably disposed on the first rail and movable relative to the rail-center marker; and
a second rail slider slidably disposed on the second rail and movable relative to the first rail slider.

13. The teaching device of claim 12, wherein the second set of equipment further comprises:
a box disposed on the base, the box having opposing upper and lower sides, the lower side adjacent the base, wherein the rail-center marker is disposed at a center of a length of the box in the length direction, and
wherein the first support portions of the first and second rails extend from the base on one side of the box and the main rail portions extend in the length direction above the upper side of the box.

14. The teaching device of claim 1, further comprising:
a third set of equipment, the third set of equipment comprising:
a frame having a first axis portion;
a first hinged door disposed in the frame, the first hinged door rotatable about the first axis portion of the frame in a first rotation direction; and
a first drawer disposed in the frame, the first drawer reciprocatable between an open, extended position and a closed, retracted position.

15. The teaching device of claim 14, wherein the third set of equipment further comprises:
a second hinged door disposed in the frame, the second hinged door rotatable about a second axis portion of the frame in a different direction than the first rotation direction; and
a second drawer disposed in the frame, the second drawer reciprocatable between an open, extended position and a closed, retracted position.

16. The teaching device of claim 1, further comprising:
a balance platform configured to support the weight of a person, the balance platform comprising:
a balance platform base;
a first foot supporter disposed on the balance platform base, the first foot supporter including a first spring and configured to support a first foot of the person; and
a support bar disposed on the balance platform base or on the base of the device, the support bar configured to help the person maintain balance while standing on the first foot supporter.

17. The teaching device of claim 16, wherein the balance platform further comprises:
a second foot supporter disposed on the balance platform base, the second foot supporter including a second spring and configured to support a second foot of the person or a foot of another person.

18. A teaching device comprising:
a base;
a first set of equipment, the first set of equipment comprising:
a first rod portion, the first rod portion including a first spiraling rod portion installed in the base;
a first encircled object disposed on the base plate and encircled by the first spiraling rod portion;
a first rod slider slidably movable along the first rod portion and around the first encircled object;
a third rod portion;
a substantially horizontal plate disposed around the third rod portion; and
a substantially vertical plate disposed around the third rod portion and substantially perpendicular to the substantially horizontal plate,
wherein the first rod slider or a third rod slider is slidably movable along the third rod portion and movable through the substantially horizontal and vertical plates such that the first rod slider or the third rod slider is configured to be positioned below the substantially horizontal plate, above the substantially horizontal plate, behind the substantially vertical plate, or in front of the substantially vertical plate.

19. The teaching device of claim 18,
wherein the third rod portion is connected to the first rod portion, and the first rod slider is slidably movable and along the third rod portion through the substantially horizontal and vertical plates and along the first rod portion around the first encircled object.

* * * * *